(12) United States Patent
Hoffeld

(10) Patent No.: US 8,601,803 B2
(45) Date of Patent: Dec. 10, 2013

(54) HYDRODYNAMIC CLUTCH

(75) Inventor: Harald Hoffeld, Crailsheim (DE)

(73) Assignee: Voith Patent GmbH, Heidenheim (DE)

( * ) Notice: Subject to any disclaimer, the term of this patent is extended or adjusted under 35 U.S.C. 154(b) by 929 days.

(21) Appl. No.: 12/451,878

(22) PCT Filed: Jul. 4, 2008

(86) PCT No.: PCT/EP2008/005470
§ 371 (c)(1),
(2), (4) Date: Mar. 26, 2010

(87) PCT Pub. No.: WO2009/007062
PCT Pub. Date: Jan. 15, 2009

(65) Prior Publication Data
US 2010/0282559 A1 Nov. 11, 2010

(30) Foreign Application Priority Data
Jul. 11, 2007 (DE) .......................... 10 2007 032 212

(51) Int. Cl.
*F16D 33/06* (2006.01)
(52) U.S. Cl.
USPC .............................................. 60/357; 60/366
(58) Field of Classification Search
USPC .................... 60/330, 357, 364, 366
See application file for complete search history.

(56) References Cited

U.S. PATENT DOCUMENTS

| 2,301,645 | A | * | 11/1942 | Sinclair | ............................ 60/365 |
| 3,107,492 | A | | 10/1963 | Croft | |
| 3,145,535 | A | * | 8/1964 | Schneider | ........................ 60/366 |
| 4,669,262 | A | * | 6/1987 | Muller | ............................ 60/347 |
| 4,761,952 | A | * | 8/1988 | Holler | ............................ 60/330 |
| 5,651,432 | A | | 7/1997 | Vogelsang | |
| 6,065,286 | A | * | 5/2000 | Hellinger | ........................ 60/330 |

FOREIGN PATENT DOCUMENTS

| DE | 2334301 A1 | 1/1974 |
| DE | 2606615 A1 | 9/1976 |
| DE | 3531987 A1 | 4/1987 |
| DE | 9213096 U1 | 12/1992 |
| DE | 19811252 A1 | 10/1999 |
| DE | 10251969 A1 | 5/2004 |
| DE | 10251970 A1 | 6/2004 |
| DE | 10338010 B3 | 2/2005 |
| FR | 2276516 A1 | 1/1976 |
| GB | 1272517 A | 5/1972 |
| UA | 13 781 U | 4/2006 |

* cited by examiner

*Primary Examiner* — Edward Look
*Assistant Examiner* — Michael Quandt
(74) *Attorney, Agent, or Firm* — Farjami & Farjami LLP

(57) ABSTRACT

The invention relates to a hydrodynamic clutch having constant or variable filling of work medium
  having a pump wheel, comprising pump wheel blading, and
  having a turbine wheel, comprising turbine wheel blading;
  pump wheel and turbine wheel forming a toroidal work space with one another, which is fillable with the work medium for torque transmission;
  having a storage space for receiving work medium from the work space, the storage space having a connection which conducts work medium to the work space;
  the work medium can be conducted from the storage space into the work space to increase the transmittable torque and from the work space into the storage space to reduce the transmittable torque.
The hydrodynamic clutch is characterized in that the ratio of the volume of the work space to the installation volume of the hydrodynamic clutch is greater than 0.26, the installation volume of the hydrodynamic clutch being defined by a cylinder volume having constant diameter, whose external diameter corresponds to the maximum external diameter of the hydrodynamic clutch, and whose axial length corresponds to the maximum axial extension of the hydrodynamic clutch.

20 Claims, 1 Drawing Sheet

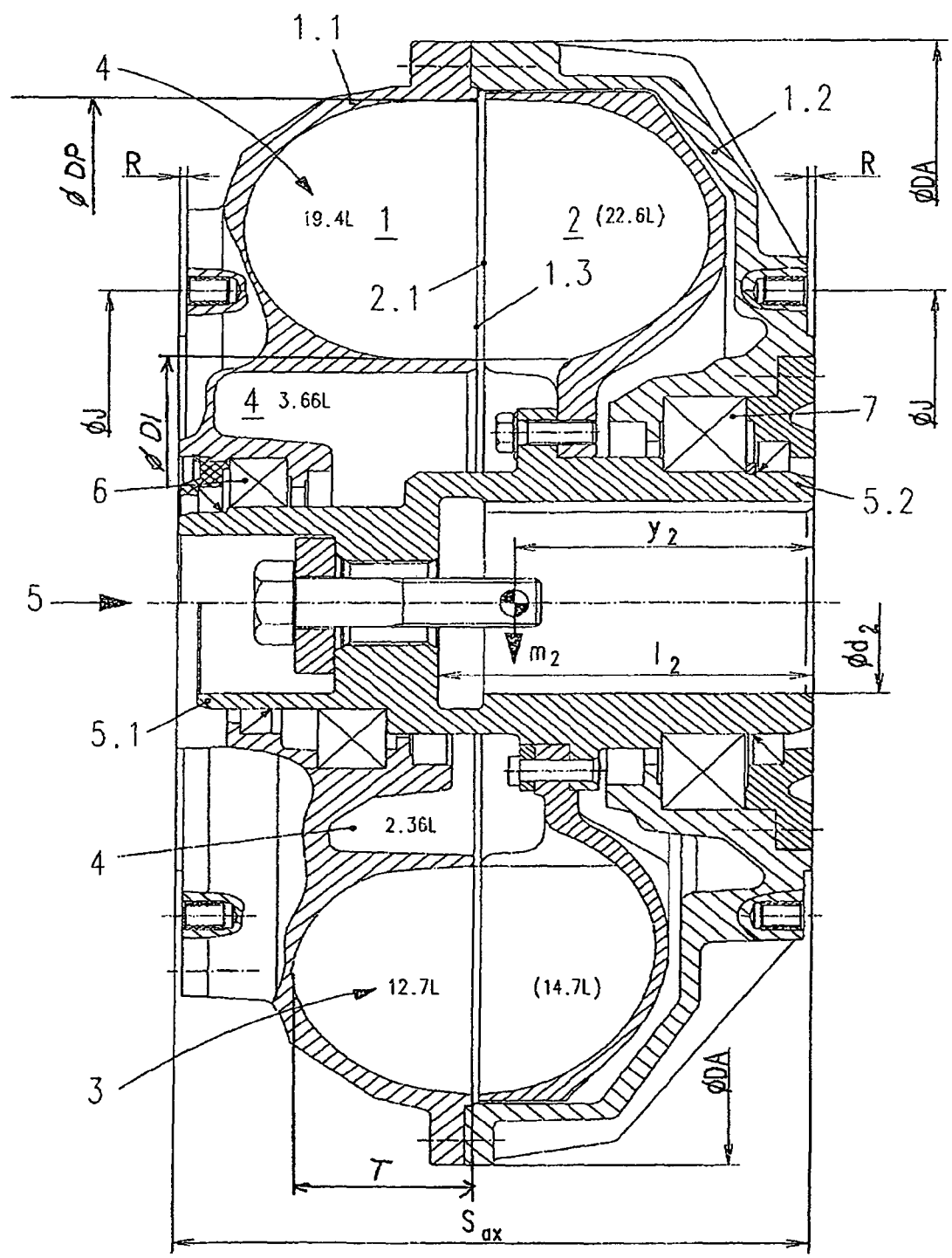

HYDRODYNAMIC CLUTCH

This is a U.S. national phase application which is based on, and claims priority from, PCT application Serial No. PCT/EP2008/005470, filed on Jul. 4, 2008, which claims priority from foreign application Serial No. DE 102007032212.9, filed on Jul. 11, 2007 in Germany.

The present invention relates to a hydrodynamic clutch having constant or variable filling according to the preamble of claim 1.

One skilled in the art differentiates between hydrodynamic clutches having constant filling and clutches which can be filled and emptied. While in the latter case, the work medium can be supplied to the work space of the clutch or removed therefrom from an external loop depending on the desired fill level, in the first case, the work medium always remains inside the clutch. This causes two constructive difficulties: firstly, a storage space must be provided inside the clutch, which receives the work medium which is not to dwell in the work space because of the desired operating state. In addition, the work medium, which is heated by fluid friction, cannot be cooled in an external heat exchanger, as is normally situated in the external work medium loop of the clutches which can be filled and emptied. This storage space requires installation space inside the clutch and measures are required in order to dissipate the heat from the interior of the clutch.

Greater demands in regard to their performance are placed on hydrodynamic clutches having constant filling. This means that the greatest possible drive power is to be transmitted using them from a drive machine to a work machine without wear. The installation space available for the hydrodynamic clutch is simultaneously limited in many fields of use. Typical clutches cannot satisfactorily fulfill these requirements.

A hydrodynamic clutch according to the species having constant or variable filling of work medium is known from the closest prior art in the form of U.S. Pat. No. 3,107,492 A. This clutch has a work space and a storage space. The storage space is adjacent to the work space in the axial direction. Work medium can be conducted from the storage space into the work space or from the work space into the storage space to influence the transmitted torque.

In addition, to the work space and the storage space, further spaces or chambers may be provided in the hydrodynamic clutch or also outside thereof. For example, one or more deceleration spaces having a predetermined size may particularly be provided radially inside the work space. It is also possible to provide a further deceleration space or an annular space in general for receiving work medium additionally completely or partially radially outside the work space. For example, reference is made to European Patent Applicant 0 206 122 A1, whose described spaces inside the hydrodynamic clutch, which are provided in addition to the storage space and the work space, may be provided in the scope of the present invention.

The invention is therefore based on the object of disclosing a hydrodynamic clutch having constant or variable filling, which offers the capability in relation to known clutches of transmitting a greater drive power with construction volumes which are not enlarged.

This object is achieved by a hydrodynamic clutch having the features of claim 1. The dependent claims describe particularly advantageous refinements of the invention.

The hydrodynamic clutch according to the invention has a toroidal work space, which is implemented by a pump wheel and the turbine wheel, which are opposite to one another. A storage space is provided inside the clutch, which has a conductive connection to the work space, so that work medium can be conducted from the storage space into the work space or from the work space into the storage space, respectively.

The hydrodynamic clutch has an installation volume which is determined by its spatial extension. The installation volume in the meaning of the present invention is defined by a cylinder volume having a constant external diameter, the external diameter of the cylinder volume corresponding to the maximum external diameter DA of the hydrodynamic clutch, and the axial length of the cylinder volume being equal to the maximum axial extension Sax of the hydrodynamic clutch. According to the invention, the ratio of the volume of the work space of the hydrodynamic clutch to the installation volume is at least 0.26. In particular, the ratio the volume of the work space of the hydrodynamic clutch to the installation volume of the clutch is greater than 0.26 and, for example, is in the range from 0.26 to 0.5, in particular in the range from 0.26 to 0.40 or 0.30.

In addition, it is particularly advantageous if the ratio of the volume of the storage space to the volume of the work space of the hydrodynamic clutch is at least equal to 0.185, and is particularly greater than 0.15. This ratio can advantageously be in the range from 0.185 to 2.5, particularly advantageously in the range from 0.185 to 0.190.

In order to achieve this work space volume, which is significantly greater than typical clutches, in relation to the total volume of the hydrodynamic clutch, it is particularly advantageous to implement the ratio of the profile diameter to the external diameter of the clutch as greater than or equal to 0.89:

The profile diameter DP is understood by one skilled in the art as the external diameter of the blade profile, this diameter typically being the same for pump wheel and turbine wheel.

Such a ratio of profile diameter to external diameter can be achieved, for example, in that the external diameter of the hydrodynamic clutch is 556 mm and the profile diameter is 500 mm.

A storage space in the meaning of the present invention is to be understood as the space inside the hydrodynamic clutch, which receives the work medium within the hydrodynamic clutch which is not located in the work space. The work space is precisely defined by the volume which the spaces between the individual blades of the pump wheel and the turbine wheel implement together viewed in the peripheral direction, supplemented by the annular volume viewed in the axial direction between the blades of the pump wheel and the turbine wheel. The storage space is thus blade-free and can be situated completely or partially radially within the work space inside the hydrodynamic clutch. According to one embodiment, as will be described later with reference to the figure, the storage space, which is situated radially completely inside the work space, opens directly on the radial internal circumference of the work space, for example, in the axial section of the turbine wheel.

In addition, to the work space and the receptacle space storage space, further spaces or chambers may be provided in the hydrodynamic clutch or also outside thereof. For example, one or more deceleration spaces having a predetermined size may particularly be provided radially inside the work space. It is also possible to provide a further deceleration space or an annular space in general for receiving work medium additionally completely or partially radially outside the work space. For example, reference is made to European Patent Applicant 0 206 122 A1, whose described spaces inside the hydrodynamic clutch, which are provided in addition to the storage space and the work space, may be provided in the scope of the present invention.

According to a special embodiment of the invention, however, the hydrodynamic clutch exclusively has one work space, one storage space, and particularly, but not necessarily a remaining space finable by work medium between the shell of the hydrodynamic clutch and the rear of the blade wheel enclosed thereby, which revolves at a relative speed in relation to the shell.

The present invention can be used both in hydrodynamic clutches having internal wheel drive and also in hydrodynamic clutches having external wheel drive. In hydrodynamic clutches having internal wheel drive, each blade wheel is driven in particular via a drive shaft which is enclosed by the clutch shell together with the blade wheel then situated on the output side. In hydrodynamic clutches having external wheel drive, the power flow is precisely opposite. The external wheel to which the shell is typically attached is thus driven by a drive machine, and the inner wheel enclosed by the outer wheel and the shell is situated on the output side.

The described size ratio of work space volume in relation to the total volume is advantageously also achieved, in that the profile internal diameter DI to the profile diameter DP is less than 0.5, in particular less than or equal to 0.485. This means that the profile height (DP−DI)/2 is comparatively large, whereby a slip reduction is achieved by the volume increase. In addition, a further slip reduction can be achieved in that the profile depth T/DP is also enlarged in comparison to typical clutches. In particular, the ratio of the profile depth T to the profile diameter DP is greater than 0.16, particularly advantageously greater than or equal to 0.165.

The inventor has additionally recognized that it is advantageous in a refinement of the invention if the number of the blades is reduced in relation to known hydrodynamic clutches having constant filling and comparable total volume. Specifically, the optimum of the blading is at a lower blade count for lower nominal slip. This lower nominal slip is achieved by the described slip reduction through optimal construction space exploitation. Pump wheel and turbine wheel particularly advantageously do not have the same blade count. In particular, the pump wheel has one more blade than the turbine wheel.

Through the implementation according to the invention of a hydrodynamic clutch having constant filling, in particular by enlarging the work space and the storage space with external dimensions of the clutch which remain the same, a significantly increased power transmission capability of the hydrodynamic clutch can be achieved.

A particularly advantageous constructive implementation of the hydrodynamic clutch according to the invention is described in detail hereafter.

FIG. 1 shows such an embodiment in an axial cross-section, a typical hydrodynamic clutch having constant filling being shown, in the lower half and a hydrodynamic clutch according to the invention being shown in the upper half.

As is immediately obvious, the installation dimensions of the improved hydrodynamic clutch according to the invention correspond to the installation dimensions of the typical hydrodynamic clutch.

A pump wheel 1 and a turbine wheel 2, which implement a work space 3 together, may be recognized. In addition, a storage space 4, which is used as a collection space for work medium not required in the work space, can be recognized. The storage space extends along the axial direction of the hydrodynamic clutch completely radially inside the work space 3. Specifically, viewed in the axial direction, the storage space 4 extends from the middle of the turbine wheel 2 up to beyond the area of the work space 3 situated in the pump wheel 1, up to a predetermined distance in relation to the axial end of the hydrodynamic clutch, which is, for example, 10 mm, generally between 5 and 20 mm, particularly advantageously between 8 and 12 mm.

The pump wheel 1 encloses the turbine wheel 2 together with the shell 1.2. The pump wheel 1 and the shell 1.2 together form a drive rotor 1.1. As shown, the pump wheel 1 can be screwed to the shell 1.2 so that they enclose a continuous cavity, in which the turbine wheel 2 is situated on one side, and which contains the storage space 4 on the other side.

The pump wheel 1 carries a plurality of blade profiles, also called blading 1.3. The maximum axial extension of a blade profile is referred to as the profile depth T. As shown, the external diameter of the profile is referred to as the profile diameter DP and the internal diameter of the profile as the profile internal diameter DI. The profile height thus results from half of the difference between the profile diameter and the profile internal diameter.

The turbine wheel also carries a plurality of blade profiles having correspondingly defined dimensions, in general the turbine wheel blading 2.1. The turbine wheel 2 is connected rotationally fixed to the clutch hub 5 using a screw connection. The clutch hub 5 is implemented as a hollow shaft which extends axially through the pump wheel 1 and the shell 1.2. The clutch hub 5 is partially pushed over the shaft of a work machine, which is implemented as a solid shaft and is frontally screwed onto the clutch hub.

The pump wheel 1 of the illustrated embodiment of the clutch according to the invention is mounted using a radial bearing 6 on a first part 5.1 of the clutch hub 5 viewed in axial direction. The bearing 6 is implemented as smaller in comparison to the corresponding bearing of the typical clutch in the lower part of the figure shown. The storage space 4 can thus be implemented larger, its dimensions being discussed in greater detail hereafter.

The shell 1.2 is also mounted on the clutch hub 5, on a second part 5.2, which axially adjoins the first part 5.1, but particularly has a larger diameter, as shown. The bearing 7 used for this purpose is an axial-radial bearing, i.e., a so-called solid bearing. In this way, the small bearing 6 in the outer wheel 1.1 does not have to absorb the hydraulic axial force, which results in an increase of service life. To be able to dissipate sufficient heat outward from the inner space of the clutch, the outer wheel can be implemented having ribbing, which enlarges the surface area. Such ribbing can simultaneously be saved on the shell 1.2.

The pump wheel 1, the turbine wheel 2, and the shell 1.2 may particularly advantageously be produced from an aluminum material, for example, from GAlSi 12. To increase the possible torque transmission at the connection between the turbine wheel and the clutch hub, the turbine wheel can be produced from a ferrous material, such as GGG.

In comparison to the typical clutch, which is shown in the lower part of FIG. 1, the volume of the work space was enlarged by 50%, and the volume of the storage space was also increased by 50%. The external diameter DA of 556 mm was simultaneously maintained, as was the axial extension Sax of 246 mm.

The precise data may be inferred from the following 2 tables.

DP=500
DI/DP=0.485
T/DP=0.18
storage space/work space=3.66/19.4
=0.188
blade count AR=41
blade count IR=40

TABLE 1 data of the embodiment according to the invention in the upper half of FIG. 1.

| VTC size/type | Maximum oil filling in liters | Total weight in kilograms | Weight load VTC $m^2$ (kg) | $y^2$ (mm) | Mass moment of inertia (inner part) [kgm * m] | (outer part) [kgm * m] |
|---|---|---|---|---|---|---|
| 500 TXL | 22.6 | Approx. 90 | 90 | Approx. 130 | 0.679 | 1.699 |

DP=487
DI/DP=0.534
T/DP=0.144
storage space/work space=2.36/12.7
=0.186
blade count AR=46
blade count IR=46

TABLE 2 data of the typical clutch in the lower half of FIG. 1.

| VTC size/type | Maximum oil filling in liters | Total weight in kilograms | Weight load VTC $m^2$ (kg) | $y^2$ (mm) | Mass moment of inertia (inner part) [kgm * m] | (outer part) [kgm * m] |
|---|---|---|---|---|---|---|
| 487 T | 14.7 | 79 | 79 | 130 | 0.565 | 1.635 |

Through the described measures, a performance increase of approximately 50% can be achieved in the same installation space. This is essentially caused by the nominal slip improvement achieved as a result of the construction measures, i.e., the shift of the nominal slip to a lower value. Because of the lower nominal slip, the clutch according to the invention can be designed for a performance for transmitting significantly larger starting torques.

| List of reference numerals | |
|---|---|
| 1 | pump wheel |
| 1.1 | drive rotor |
| 1.2 | shell |
| 1.3 | pump wheel blading |
| 2 | turbine wheel |
| 2.1 | turbine wheel blading |
| 3 | work space |
| 4 | storage space |
| 5 | clutch hub |
| 5.1 | first part |
| 5.2 | second part |
| 6 | radial bearing |
| 7 | axial-radial bearing |

The invention claimed is:

1. A hydrodynamic clutch having constant or variable filling of a work medium, the hydrodynamic clutch comprising:
a pump wheel having a pump wheel blading;
a turbine wheel having a turbine wheel blading, wherein the pump wheel and the turbine wheel form a toroidal work space, wherein the toroidal work space is fillable with the work medium for a torque transmission;
a storage space for receiving the work medium from the toroidal work space, the storage space having a connection that conducts the work medium to the toroidal work space, wherein
the work medium is conducted from the storage space into the toroidal work space to increase the torque transmission and from the toroidal work space into the storage space to reduce the torque transmission, and wherein
a ratio of a volume of the toroidal work space to an installation volume of the hydrodynamic clutch is greater than 0.26 and less than 0.5, the installation volume of the hydrodynamic clutch being defined by a cylinder volume having a constant diameter, wherein the cylinder volume has an external diameter corresponding to a maximum external diameter of the hydrodynamic clutch and an axial length corresponding to a maximum axial extension of the hydrodynamic clutch; and
a clutch hub implemented as a hollow shaft, wherein the clutch hub can receive a shaft.

2. The hydrodynamic clutch according to claim 1, wherein a ratio of a storage volume of the storage space to the volume of the toroidal work space is greater than 0.185.

3. The hydrodynamic clutch according to claim 1, wherein a ratio of a profile diameter of the pump wheel blading to the maximum external diameter of the hydrodynamic clutch is greater than or equal to 0.89.

4. The hydrodynamic clutch according to claim 1, wherein a ratio of a profile internal diameter of the pump wheel blading to a profile diameter is less than 0.5.

5. The hydrodynamic clutch according to claim 1, wherein a ratio of a profile depth of the pump wheel blading to a profile diameter is greater than 0.16.

6. The hydrodynamic clutch according to claim 1, wherein the pump wheel and the turbine wheel have different blade counts.

7. The hydrodynamic clutch according to claim 1, wherein:
the pump wheel is axially attached to a shell;
the pump wheel and the shell are connected diametrically opposite so that a cavity is formed, wherein the cavity is where the turbine wheel is received;
the turbine wheel is situated rotationally fixed on the clutch hub, wherein the clutch hub extends radially inside in an axial direction through the pump wheel and the shell;
the pump wheel is mounted using a radial bearing on the clutch hub, and the shell is mounted using an axial-radial bearing on the clutch hub.

8. The hydrodynamic clutch according to claim 7, wherein the pump wheel and/or the shell is/are provided on an external surface of the clutch hub with ribbing that enlarges a surface area for better heat dissipation.

9. The hydrodynamic clutch according claim 1, wherein the shaft has a diameter equal to 0.21 times a profile diameter.

10. The hydrodynamic clutch according to claim 1, wherein the clutch hub is rotationally fixed to the shaft using a screw connection.

11. A hydrodynamic clutch having constant or variable filling of work medium, the hydrodynamic clutch comprising:
a pump wheel having a pump wheel blading;
a turbine wheel having a turbine wheel wherein, the pump wheel and the turbine wheel form a toroidal work space that is fillable with the work medium for a torque transmission; and
a storage space for receiving the work medium from the toroidal work space, the storage space having a connection which conducts the work medium to the toroidal work space, wherein the work medium is conducted from the storage space into the toroidal work space to increase the torque transmission and from the toroidal work space into the storage space to reduce the torque transmission, and wherein a ratio of a volume of the toroidal work space to an installation volume of the hydrodynamic clutch is greater than 0.26 and less than 0.5, the installation volume of the hydrodynamic clutch being defined by a cylinder volume having constant diameter, wherein the cylinder volume has an external diameter corresponding to a maximum external diameter of the hydrodynamic clutch and an axial length corresponding to a maximum axial extension of the hydrodynamic clutch; and the storage space is situated completely radially inside the toroidal work space.

12. The hydrodynamic clutch according to claim 11, wherein a ratio of a storage volume of the storage space to the volume of the toroidal work space is greater than 0.185.

13. The hydrodynamic clutch according to claim 11, wherein a ratio of a profile diameter of the pump wheel blading to the maximum external diameter of the hydrodynamic clutch is greater than or equal to 0.89.

14. The hydrodynamic clutch according to claim 11, wherein a ratio of a profile internal diameter of the pump wheel blading to a profile diameter is less than 0.5.

15. The hydrodynamic clutch according to claim 11, wherein a ratio of a profile depth of the pump wheel blading to a profile diameter is greater than 0.16.

16. The hydrodynamic clutch according to claim 11, wherein the pump wheel and the turbine wheel have different blade counts.

17. The hydrodynamic clutch according to claim 11, wherein
the pump wheel is axially attached to a shell;
the pump wheel and the shell are connected diametrically opposite so that a cavity is formed, the cavity is where the turbine wheel is received;
the turbine wheel is situated rotationally fixed on a clutch hub that extends radially inside in an axial direction through the pump wheel and the shell;
the pump wheel is mounted using a radial bearing on the clutch hub, and the shell is mounted using an axial-radial bearing on the clutch hub.

18. The hydrodynamic clutch according to claim 17, wherein the pump wheel and/or the shell is/are provided on an external surface of the clutch hub with ribbing which enlarges a surface area for better heat dissipation.

19. The hydrodynamic clutch according claim 11, wherein the clutch hub can receive a shaft that has a diameter equal to 0.21 times a profile diameter.

20. The hydrodynamic clutch according to claim 11, wherein the clutch hub is rotationally fixed to the shaft using a screw connection.

* * * * *